US012809435B2

(12) United States Patent
Ye et al.

(10) Patent No.: US 12,809,435 B2
(45) Date of Patent: Nov. 24, 2026

(54) SAFE DESIGNATION FOR SOC SAFE POWER MANAGEMENT

(71) Applicant: QUALCOMM Incorporated, San Diego, CA (US)

(72) Inventors: Changqing Ye, San Marcos, CA (US); Jeffrey Gemar, San Diego, CA (US); Nelson Rasquinha, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 139 days.

(21) Appl. No.: 18/404,691

(22) Filed: Jan. 4, 2024

(65) Prior Publication Data

US 2025/0224789 A1 Jul. 10, 2025

(51) Int. Cl.

| | |
|---|---|
| ***G06F 1/26*** | (2006.01) |
| ***B60H 1/00*** | (2006.01) |
| ***B60R 16/023*** | (2006.01) |
| ***B60W 50/00*** | (2006.01) |

(52) U.S. Cl.

CPC ........... *G06F 1/26* (2013.01); *B60H 1/00778* (2013.01); *B60R 16/0231* (2013.01); *B60W 50/0098* (2013.01); *B60W 2520/04* (2013.01)

(58) Field of Classification Search

None

See application file for complete search history.

(56) References Cited

U.S. PATENT DOCUMENTS

| | | | | |
|---|---|---|---|---|
| 10,437,550 | B2 | 10/2019 | Braun et al. | |
| 10,964,191 | B2 | 3/2021 | Jati et al. | |
| 11,023,633 | B2 | 6/2021 | Imamura | |
| 11,533,726 | B2 * | 12/2022 | Higgins | H04B 1/713 |
| 11,592,889 | B2 | 2/2023 | Davidov et al. | |
| 11,675,604 | B2 * | 6/2023 | Shaddock | H03K 19/17758 713/1 |
| 11,783,039 | B2 * | 10/2023 | Aschauer | G06F 21/575 726/22 |
| 11,834,071 | B2 * | 12/2023 | Sadek | B60W 50/14 |
| 12,001,374 | B2 * | 6/2024 | Kachare | G06F 13/1668 |
| 12,099,611 | B2 * | 9/2024 | Ratiner | G06F 21/54 |

(Continued)

OTHER PUBLICATIONS

Shanker Shreejith Reconfigurable Computing in Next-Generation Automotive Networks 12 IEEE Embedded Systems Letters, vol. 5, No. 1, Mar. 2013 (Year: 2013).*

(Continued)

*Primary Examiner* — Jean Paul Cass

(74) *Attorney, Agent, or Firm* — LOZA & LOZA, LLP

(57) ABSTRACT

Aspects relate to mechanisms for supporting the identification of a respective safe designation for each of a plurality of electronic control units (ECUs) on a system-on-chip (SoC) of a vehicle. Based on the respective safe designations, a respective configuration of at least one of a power feature or a limit feature can be loaded into each of the ECUs. Safe designations can include safety critical and non-safety critical designations based on the corresponding original equipment manufacturer configurations for each of the ECUs. The safe designations and corresponding configurations can further be modified based on at least one of a vehicle drive mode of the vehicle or an SoC operation stage of the SoC.

30 Claims, 12 Drawing Sheets

(56) References Cited

U.S. PATENT DOCUMENTS

| | | | | |
|---|---|---|---|---|
| 12,135,606 | B2 * | 11/2024 | Hwang | G06N 3/0499 |
| 12,341,790 | B2 * | 6/2025 | Keith, Jr. | G06F 21/316 |
| 2002/0108065 | A1 * | 8/2002 | Mares | H02J 1/14 713/300 |
| 2003/0095367 | A1 * | 5/2003 | Mares | G05D 1/0077 361/93.7 |
| 2006/0171329 | A1 * | 8/2006 | Ying | G06F 1/26 370/254 |
| 2018/0337957 | A1 * | 11/2018 | Chen | H04L 9/3268 |
| 2019/0049912 | A1 * | 2/2019 | Poornachandran | G05B 19/0421 |
| 2019/0379682 | A1 * | 12/2019 | Overby | H04L 12/40 |
| 2020/0379530 | A1 * | 12/2020 | Srivastava | G06F 1/206 |
| 2022/0342673 | A1 | 10/2022 | Wang et al. | |
| 2023/0138112 | A1 * | 5/2023 | Gross | G05D 1/0027 701/24 |
| 2024/0354481 | A1 * | 10/2024 | Madden | G06F 30/392 |
| 2025/0077911 | A1 * | 3/2025 | Nair | G06N 5/04 |

OTHER PUBLICATIONS

International Search Report and Written Opinion—PCT/US2024/055567—ISA/EPO—Mar. 4, 2025.

Shreejith S., et al., "Reconfigurable Computing in Next-Generation Automotive Networks", IEEE Embedded Systems Letters, vol. 5, No. 1, Mar. 2013, pp. 12-15, XP011494889, Abstract, p. 12, right col. 2nd and 3rd para. p. 13, left col. 2nd para. to right col. 1st para. p. 14, left col. 2nd para.

* cited by examiner

| | FuSa Level Guaranteed | No or Lowest FuSa Level |
|---|---|---|
| Performance Guaranteed | Safe-Perf (ADAS perception and decision processing on Cameras, NSPs, CPUs, GPUs) | NonSafe-Perf (IVI display, personal camera, snapshot processing on image processor) |
| Performance Variability Acceptable | Safe-NonPerf (Hypervisor services on Android pinned CPU cluster) | NonSafe-NonPerf (Gaming application on GPU) |

302 304 306 308

FIG. 3

| Power Feature (402) | ECU Configuration (404) | Safe Designation (406) |
|---|---|---|
| Active Power Feature | ECU Configuration A | Safety/Non-Safety Critical |
| Idle Power Feature | ECU Configuration B | Safety/Non-Safety Critical |

| Limit Feature (408) | ECU Configuration (410) | Safe Designation (412) |
|---|---|---|
| Temperature | ECU Configuration a | Safety/Non-Safety Critical |
| Power | ECU Configuration b | Safety/Non-Safety Critical |
| Current | ECU Configuration c | Safety/Non-Safety Critical |
| Voltage | ECU Configuration d | Safety/Non-Safety Critical |
| TDP | ECU Configuration e | Safety/Non-Safety Critical |

FIG. 4

SAFE DESIGNATION FOR SOC SAFE POWER MANAGEMENT

TECHNICAL FIELD

The technology discussed below relates generally to power management of a system-on-chip (SoC), and more particularly, to power management based on a safe designation of an electronic control unit on an SoC.

INTRODUCTION

System-on-chip (SoC) technology has emerged as a key component in vehicles. SoC technology integrates multiple electronic control units (ECUs) (e.g., central processing units (CPUs), graphic processing units (GPUs), neural signal processors (NSPs), digital signal processors (DSPs), Double Data Rate Synchronous Dynamic Random-Access Memory (DDR SDRAM), hardware accelerators, fixed function accelerators, etc.) onto a single chip. Each of the ECUs may be configured at any one time to run a respective vehicle workload, such as Advanced Driver Assistance System (ADAS), In-vehicle Infotainment (IVI) (e.g., gaming system, dashboard display, audio processing), Light Detection and Ranging (LIDAR), Radio Detection and Ranging (RADAR), and other suitable vehicle workloads. Thus, SoCs can efficiently process data from various sensors in real time to enhance the speed, accuracy, and reliability of safety systems.

Safety and power management on SoCs have traditionally been treated as mutually exclusive such that each SoC supported a static configuration of either all safety critical ECUs or all non-safety critical ECUs. Examples of safety critical ECUs include ADAS NSPs, CPUs, and GPUs. Examples of non-safety critical ECUs include IVI CPUs and other infrastructure. The latest generation SoC technology supports a flex operation that can serve both safety critical and non-safety critical ECUs on the same SoC. However, the current software architecture does not support the distinction of safety critical and non-safety critical ECUs under the flex operation. In addition, the current software architecture does not support the re-classification of ECUs at the boundary between drive modes (e.g., parked, stopped, driving) or SoC operation stages (e.g., boot, sleep/wake, run, power-down).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example an apparatus is provided including a plurality of electronic control units (ECUs) on a system-on-chip (SoC) of a vehicle and a controller configured to identify a respective safe designation for each of the plurality of ECUs. The respective safe designation for each of the plurality of ECUs includes a safety critical designation or a non-safety critical designation. The controller is further configured to load a respective configuration of at least one power feature, at least one limit feature, or a combination of the at least one power feature and the at least one limit feature into each of the plurality of ECUs based on the respective safe designation including the safety critical designation or the non-safety critical designation.

Another example provides a method of safe designation on a system-on-chip (SoC). The method includes identifying a respective safe designation for each of a plurality of electronic control units (ECUs) on the SoC of a vehicle. The respective safe designation for each of the plurality of ECUs includes a safety critical designation or a non-safety critical designation. The method further includes loading a respective configuration of at least one power feature, at least one limit feature, or a combination of the at least one power feature and the at least one limit feature into each of the plurality of ECUs based on the respective safe designation including the safety critical designation or the non-safety critical designation.

Another example provides a system-on-chip including means for identifying a respective safe designation for each of a plurality of electronic control units (ECUs) on the SoC of a vehicle. The respective safe designation for each of the plurality of ECUs includes a safety critical designation or a non-safety critical designation. The SoC further includes means for loading a respective configuration of at least one power feature, at least one limit feature, or a combination of the at least one power feature and the at least one limit feature into each of the plurality of ECUs based on the respective safe designation including the safety critical designation or the non-safety critical designation.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 3 is a diagram illustrating examples of safe designations according to some aspects.

FIG. 4 is a diagram illustrating examples of power features and limit features according to some aspects.

DETAILED DESCRIPTION

Figure 1:
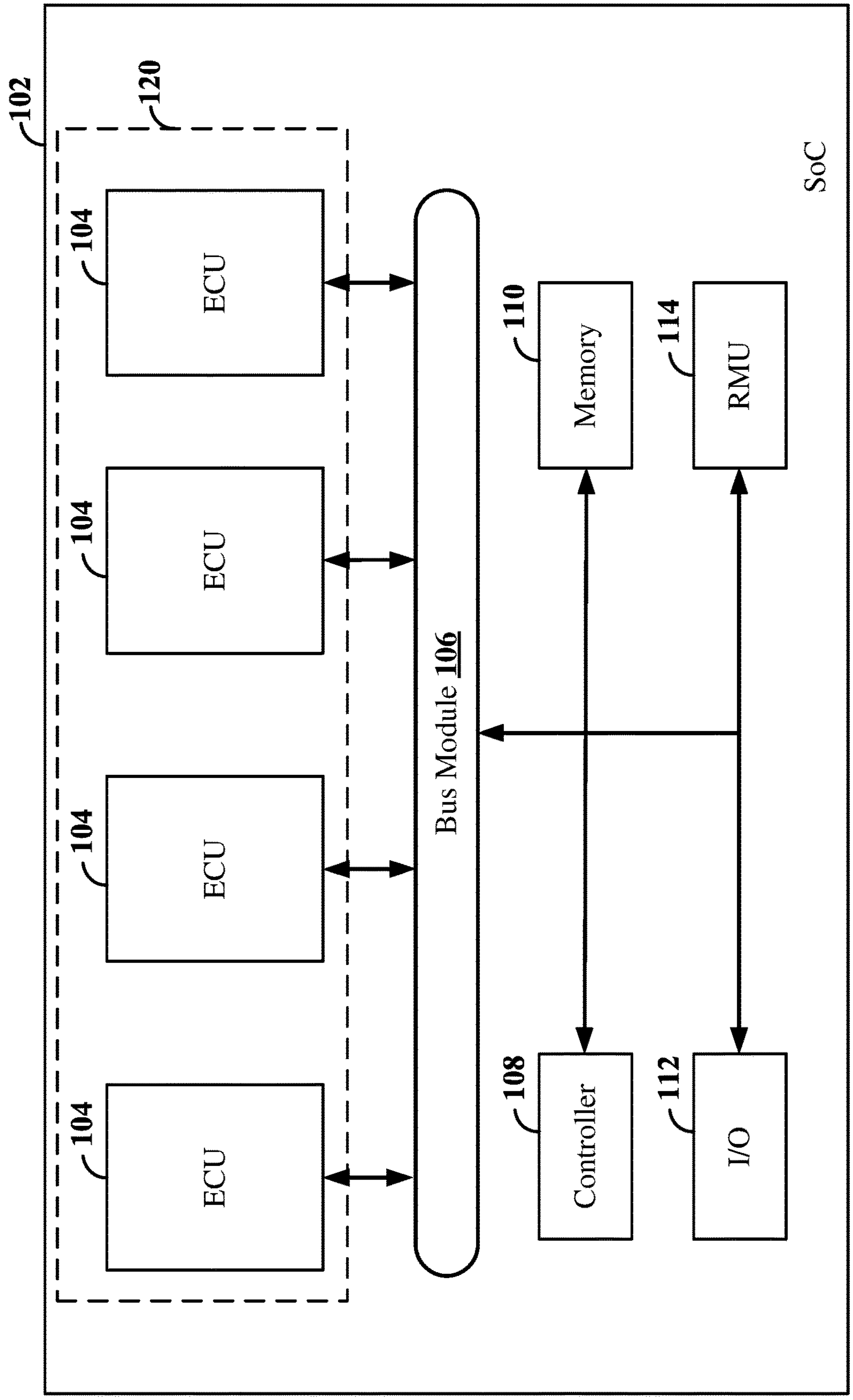
FIG. 1 is a diagram depicting an exemplary system-on-chip (SoC) according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of described examples. It is intended that innovations described herein may be practiced in a wide variety of devices, chip-level components, systems, distributed arrangements, end-user devices, etc., of varying sizes, shapes, and constitution.

Each electronic control unit (ECU) (e.g., CPU, GPU, NSP, DSP, DDR SDRAM, etc.) on a system-on-chip (SoC) of a vehicle may be dynamically configured to run a respective vehicle workload, such as ADAS, IVI, LIDAR, RADAR, and other suitable vehicle workloads. Each of the vehicle workloads may be classified as safe (safety critical) or non-safe (non-safety critical). For example, ADAS may be classified as safety critical, whereas IVI may be classified as non-safety critical. The latest generation SoC technology supports a flex operation that can support both safety critical and non-safety critical ECUs (e.g., a first ECU running a safety critical workload and a second ECU running a non-safety critical workload) on the same SoC.

The SoC technology flex operation can serve both safety critical and non-safety critical power management functionality for ECUs on the same SoC to exploit differentiated low power/performance of safety critical and non-safety critical ECUs. For example, macro-level power features may be made safe (e.g., software performance states, as defined by the voltage level and clock frequency, and interframe power gating) for both safety critical and non-safety critical ECUs. Additional micro-level and limits power management features may further be available to ECUs designated as non-safety critical. Non-safety critical ECUs may further compete for a fixed allocation of thermal design power (TDP) budget left over from the safety critical ECU workloads. However, the current software architecture does not support the distinction of safe and non-safe ECUs under the flex operation. In addition, at the boundary between drive modes (e.g., parked, stopped, driving) or SoC operation stages (e.g., boot, sleep/wake, run, power-down), it may be useful to allocate an ECU as safe or non-safe and configure it accordingly, so that correspondent SoC power and/or limit management features may be configured to maximize the power saving and performance under the constraints.

In various aspects of the disclosure, a software architecture that supports the distinction of safety critical and non-safety critical ECUs under the flex operation utilizes a safe power framework that begins with a designation of each of the ECUs on an SoC as either safety critical or non-safety critical resources based on the original equipment manufacturers (OEMs) high-level safe software architecture and ECU policies, such as drive-mode policies, park-mode policies, application policies, SoC operation stage policies, vehicle occupant interaction, and TDP budget distribution. In one example, the OEM of an ECU may statically specify the safe designation for each vehicle drive mode (e.g., vehicle operation status, such as parked with air-conditioning on or off, driving on local roads or a highway, stopped at a traffic light, etc.) or SoC operation stage (e.g., boot-up, sleep/wake-up, run, power-down, etc.). The software can then load the appropriate safe designation configuration into the ECU based on the current vehicle drive mode or SoC operation stage. For example, the configuration may include one or more power features (e.g., dynamic clock voltage scaling (DCVS), low power management, etc.) and/or limit features (power limit, temperature limit, current limit, TDP limit, etc.). In another example, the appropriate safe designation and associated configuration can be dynamically extracted and loaded into the ECU at runtime based on the workloads (e.g., safety critical or non-safety critical workloads) scheduled for the ECU at the boundary between two different drive modes and/or based on the SoC operation stage.

In an example, an application layer of the SoC may designate each ECU as safety critical or non-safety critical and a processing device on the SoC may load the configuration of the safe designation into each ECU. In addition, a secure channel may be provided to pass the safe designation from the application layer to the processing device. By enabling the SoC flex operation with the software architecture described herein, costs of computation may be reduced and power efficiency may be maximized by reducing the TDP budget spent on leakage power and increasing the TDP budget spent on workloads.

FIG. 1 is a diagram depicting an exemplary system-on-chip (SoC) according to some aspects. The SoC 102 includes a processing system 120 that includes a plurality of heterogeneous electronic control units (ECUs) 104, such as CPUs, general-purpose processors, NSPs, GPUs, DDRs, hardware accelerators, fixed function accelerators, image processors, display processors, secure processing units (SPUs), network processors, and other suitable ECU devices. The ECUs 104, may therefore, include one or more processors/cores, and each processor/core may perform operations independent of the other processors/cores. As such, each of the ECUs 104 may be configured to execute instructions to perform respective workloads.

The ECUs 104 may be organized in close proximity to one another (e.g., on a single substrate, die, integrated chip, etc.) so that they may operate at a much higher frequency/clock-rate than would be possible if the signals were to travel off-chip. The proximity of the processors/cores may also allow for the sharing of on-chip memory and resources (e.g., voltage rail), as well as for more coordinated cooperation between processors/cores. In some examples, one or more of the ECUs 104 may include a cluster of ECUs of the same type. For example, an ECU 104 may include a cluster of multiple (e.g., two or more) CPU cores with rail-sharing among the CPU cores. As another example, an ECU 104 may include an NSP core with multiple (e.g., two or more) threads.

The processing system 120 is interconnected with one or more controllers 108, one or more input/output (I/O) module(s) 112, one or more memories 110, and one or more resource management unit(s) (RMUs) 114 via a bus 106, which may include an array of reconfigurable logic gates and/or implement a bus architecture (e.g., CoreConnect, advanced microcontroller bus architecture (AMBA), etc.). The bus 106 communications may be provided by advanced interconnects, such as high performance networks on chip (NoCs). The bus 106 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. The bus 106 may include a multi-level bus system including, for example, one or more aggregate NoCs serving a plurality of clients (e.g., a plurality of ECUs 104), and one or more main NoCs serving the aggregate NoCs and one or more clients.

The controller 108 may be configured to manage the flow of data to and from the memory 110, an ECU memory 104, or a memory device located off-chip (e.g., a flash memory device). In some examples, the memory 110 may include a universal flash storage (UFS) host device configured to receive various memory commands from multiple masters, and address and communicate the memory commands to a memory device. The multiple masters may include ECUs 104, and/or multiple applications running on one or more of the ECUs 104. The controller 108 may include one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In some examples, the controller 108 is an application processor that may be controlled by an operating system (e.g., a high-level operating system (HLOS)) that is loaded from internal or external storage as data and instructions that are executable by the controller 108. In some examples, the controller 108 may further be configured to execute a hypervisor software application to provide a supervisory capability over several operating systems (OSs), manage access to the ECUs 104, manage access to peripherals (e.g., via the I/O module 112), and manage inter-OS communication and security.

The memory 110 may, for example, maintain software, operational parameters and other information used to configure and operate the SoC 102. The memory 110 may be implemented, for example, as a set of registers, or may be implemented in a database module, flash memory, magnetic media, non-volatile or persistent storage, optical media, a smart card, a flash memory device, a random access memory (RAM), a read only memory (ROM), a programmable ROM (PROM), an erasable PROM (EPROM), an electrically erasable PROM (EEPROM), and/or any other suitable medium for storing software and/or instructions that may be accessed and read by the controller 108 and/or ECUs 104. In some examples, the memory 110 may include a cache memory to provide temporary storage of information to enhance the processing speed of the SoC 102.

The SoC may also be coupled to internal and/or external devices, such as a display, camera, operator controls (e.g., buttons and a keypad), cooling unit, navigation system, external memory device, and/or other peripheral devices and components via the input/output module 112. For example, the I/O module 112 may include an input/output interface (e.g., a bus architecture or interconnect) or a hardware design for performing I/O operations.

The RMU 114 is configured to manage voltages (e.g., retention, nominal, or off) on one or more core logic voltage rails (e.g., voltage rails configured to provide power to one or more ECUs 104 of the processing system 120 and the bus 106) and memory voltage rails (e.g., power rails configured to provide power to the controller 108 and the memory 110). The RMU 114 may also be configured to manage one or more clock sources configured to generate clock signals for one or more ECUs 104 of the processing system 120 and the bus 106. As such, the RMU 114 may be configured to manage components such as voltage rails, voltage regulators, oscillators, phase-locked loops, peripheral bridges, data controllers, system controllers, access ports, timers, and other similar components used to support the processors and software clients running on the SoC 102, or external to the SoC 102. Thus, the RMU contains both power and limit controls and may be implemented by a combination of hardware and firmware. In some examples, the RMU 114 can be off-chip and external to the SoC 102.

In various aspects of the disclosure, the RMU 114 may be configured to operate together with the controller 108 to maximize power savings of each of the ECUs 104 without impacting safety and to maximize performance of each of the ECUs 104 within a constrained TDP budget based on a respective safe designation of each of the ECUs 104. As an example, an ECU 104 may have different safe designations based on various states associated with the SoC (e.g., drive mode states, SoC operation stage states, etc.). As another example, virtual machines (VMs) associated with the different workloads running on the ECUs 104 may have different safety criticality levels (e.g., different safe designations). In various aspects of the software architecture described herein, the safe designations may be managed by the controller 108 via a hypervisor running on the controller 108. For example, the safety critical/non-safety critical ECU configurations for each of the ECUs (e.g., based on ECU mode and/or the workload scheduled by the VM) may be generated, for example, by application layer software (e.g., HLOS or application layer subsystem (APSS)) and loaded onto the respective ECUs 104 via the hypervisor. Thus, the hypervisor may map VMs to physical SoC hardware (e.g., ECUs 104) and load the respective safety critical/non-safety critical configurations associated with each of the VMs into the appropriate ECUs 104. Those safety critical/non-safety critical ECU configurations may include, for example, power features and/or limit features that may be facilitated by the ECUs 104 in coordination with the RMU 114.

In some examples, the safe designation of an ECU 104 is statically configured by the OEM of the ECU for each SoC state (e.g., each drive mode state or SoC operation stage state). In this example, the controller 108 (e.g., an APSS running on the controller) may generate the respective safe designation configurations for each SoC state during compilation time (e.g., offline) and load the respective configuration associated with a current SoC state into the ECU via the hypervisor. Although this example may be easy to implement, the safe designation configuration may be inconsistent with the actual workload running on the ECU. In other examples, the safe designation of an ECU 104 may be dynamically configured based on the workload process running on (or scheduled to) the ECU 104. In this example, the controller 108 (e.g., an APSS running on the controller) may generate the respective safe designation configuration for each ECU at runtime after workloads are loaded on the boundary between ECU states (drive mode or SoC operation stage states). For example, the APSS may loop through each workload process running on each virtual ECU (e.g., vCPU) cluster for the requesting VMs, generate the appropriate configuration for each ECU based on the safe designation of the VM/workload, map the vECU with the physical ECU, and update/load the respective safe designation configuration into the respective ECU via the hypervisor. Although this example may be more computationally intensive, the safe designation configuration is guaranteed to match with the OEMs recommended configuration based on the workload.

In the flex operation, both safety and non-safety critical ECUs are supported on a single SoC (e.g., SoC 102). Using the software architecture and framework described herein, the safe designation (e.g., safety critical or non-safety critical) and associated ECU configurations may be flexible for different ECUs based on ECU policies (e.g., drive-mode policies, park-mode policies, application policies, SoC operation stage policies, vehicle occupant interaction, and TDP budget distribution) provided by the OEM of the ECU. In addition, the safe designations (e.g., safety critical and non-safety critical) and associated ECU configurations may be flexible for different workloads running on the ECUs. In some examples, pure safety critical or pure non-safety critical configurations (e.g., all safety critical ECUs or all non-safety critical ECUs) may be supported on the SoC 102 in the flex operation using the framework and software architecture described herein.

Figure 2:
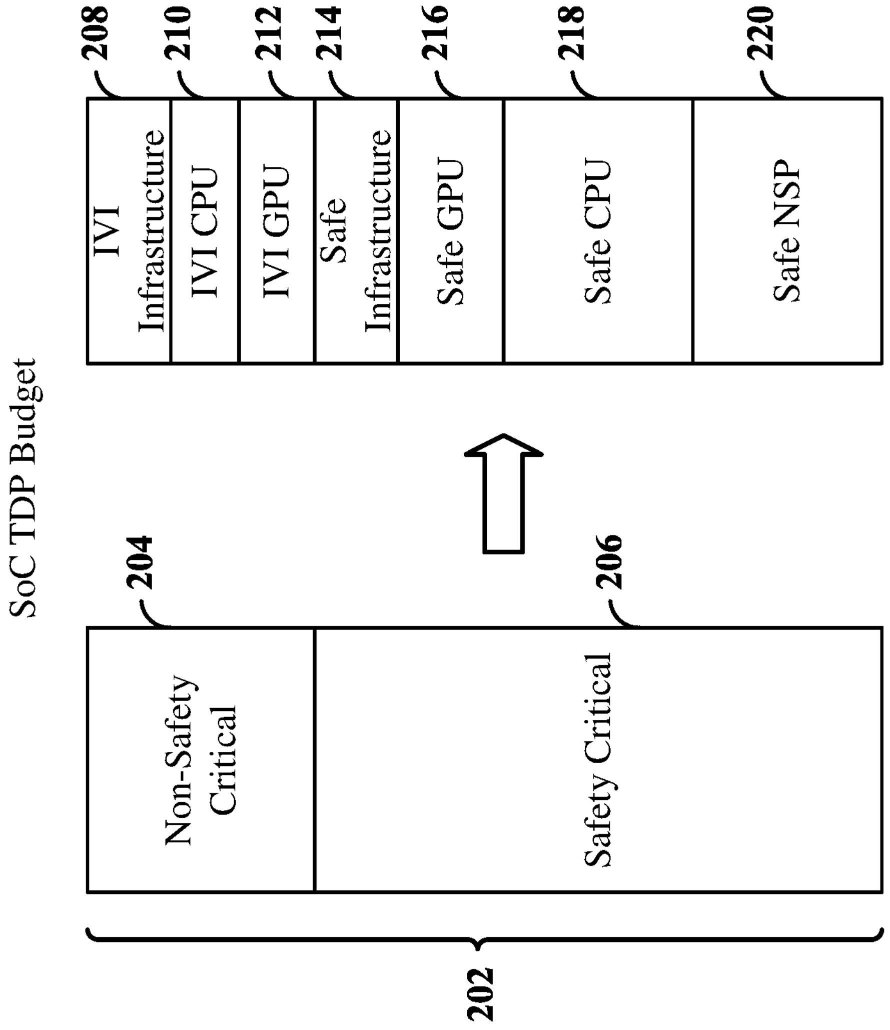
FIG. 2 is a diagram illustrating an example of a flex operation of an SoC according to some aspects.

FIG. 2 is a diagram illustrating an example of a flex operation of an SoC according to some aspects. In FIG. 2, an SoC TDP budget (e.g., 70 W-150 W) is illustrated as being shared between various workloads/ECUs 202, including both non-safety critical workloads/ECUs 204 and safety critical workloads/ECUs 206. The non-safety critical workloads/ECUs 204 may include infrastructure 208 (e.g., SoC common supports, such as clocks, internal transport networking (NoCs), memory devices (e.g., DDRs) and their controllers, etc., which may be shared between different workloads (e.g., occupied by one workload at a time) or dedicated to a single ECU), an IVI CPU 210, and an IVI GPU 212. In addition, the safety critical workloads/ECUs 206 may include safe infrastructure 214, a safe GPU 216, a safe CPU 218, and a safe NSP 220. The safety critical workloads/ECUs 206 may need a fixed amount of TDP budget to guarantee performance (e.g., to guarantee a specific frequency at a specific power with a particular grade of cooling). However, the non-safety critical workloads/ECUs 204 can apply dynamic power management, limits, throttling, etc. to maximize the performance and power efficiency within the remaining TDP budget unallocated to the safety critical workloads/ECUs 206.

In some examples, the safe designation of each ECU may be based on the Functional Safety (FuSA) standard defined in International Organization for Standardization (ISO) 26262. FIG. 3 is a diagram illustrating examples of safe designations according to some aspects. In the example shown in FIG. 3, four safe designations are illustrated, including Safe-Perf 302, Safe-NonPerf 304, NonSafe-Perf 306, and NonSafe-NonPerf 308. The Safe-Perf 302 and Safe-NonPerf 304 designations are each FuSa level guaranteed with one of the Automotive Safety Integrity Levels (ASILs) other than ASIL-Quality Management (QM). The ASIL levels include ASIL-QM, ASIL-B, ASIL-C, and ASIL-D and range from ASIL-D, representing the highest degree of automotive safety requirements to ASIL-QM, representing the lowest degree of automotive safety requirements. The Safe-Perf 302 and Safe-NonPerf 304 designations are safety critical designations that can be applied to ECUs configured to run safety critical workloads. The NonSafe-Perf 306 and NonSafe-NonPerf 308 designations are associated with either no FuSa level or the lowest FuSa level (e.g., ASIL-QM). Thus, the NonSafe-Perf 306 and NonSafe-NonPerf 308 designations are non-safety critical designations that can be applied to ECUs configured to run non-safety critical workloads.

In addition, the Safe-Perf 302 and NonSafe-Perf 306 designations may each include performance requirements related to run-time deadlines. For example, each of the Safe-Perf 302 and NonSafe-Perf 306 designations may have fixed run-time deadlines. By contrast, the Safe-NonPerf 304 and NonSafe-NonPerf 308 designations do not include performance requirements, and as a result, some performance variability is acceptable.

Examples of Safe-Perf 302 workloads/ECUs include, but are not limited to, ADAS perception and decision processing on cameras, NSPs, CPUs, and GPUs. An example of a Safe-NonPerf 304 workload/ECU includes hypervisor services on a mobile phone operating system pinned CPU cluster. Examples of NonSafe-Perf 306 workloads/ECUs include, but are not limited to, IVI display or personal camera, snapshot processing on an image processor. An example of a NonSafe-NonPerf 308 workload/ECU includes a gaming application on a GPU.

In some examples, the safe designation of an ECU may be based on the workload running on the ECU. The workload safety criticality may be derived, for example, from an initialized VM that scheduled the workload. For example, workloads scheduled by a primary virtual machine (PVM)

(e.g., HLOS or APSS) may be designated safety critical workloads, whereas workloads scheduled by a guest virtual machine (GVM) (e.g., mobile phone operating system) may be designated non-safety critical workloads. Each safe designation for an ECU may have a respective ECU configuration associated therewith that specifies one or more power features and/or limit features. The respective ECU configuration associated with each safe designation may be defined, for example, by the OEM of the ECU based on the FuSa qualifications of the ECU.

FIG. 4 is a diagram illustrating examples of power features and limit features according to some aspects. Each of the power and limit features 402 and 408, respectively, may be individually configured for each ECU on an SoC (e.g., by the respective OEM of each ECU based on the FuSa qualifications of that ECU) to provide for safety critical and non-safety critical configurations of the ECU. For example, each power feature 402 may have a respective ECU configuration 404 for a particular ECU on an SoC and a respective safe designation 406 (e.g., safety critical or non-safety critical) associated therewith. In addition, each limit feature 408 may also have a respective ECU configuration 410 and a respective safe designation 412 (e.g., safety/non-safety critical) associated therewith for the particular ECU. Examples of power features 402 may include, but are not limited to, active power features (e.g., dynamic clock and voltage scaling (DCVS), margin recovery features, etc.) and idle power features (e.g., low power features with different low power modes, including sleep/retention and power collapse). Examples of limit features 408 may include, but are not limited to, temperature limits, power limits, current limits (including change in current limits), voltage limits (including change in voltage limits), and TDP limits.

In some examples, the respective ECU configurations 404/410 of one or more power features 402 and/or limit features 408 may be loaded into an ECU based on the respective safe designation 406/412 associated with the ECU. For example, one or more power features 402 (e.g., DCVS) and/or limit features 408 (e.g., change in current/voltage limits) may be associated with the Safe-Perf designation 406/412. When the safe designation of the ECU is determined to be Safe-Perf, the ECU configurations 404/410 of each of the Safe-Perf power/limit features 402/408 may then be loaded into the ECU. As another example, one or more power features 402 (e.g., low power sleep) and/or limit features (e.g., power limits) may be associated with the Non-Safe-Perf designation 406/412 and may be loaded into the ECU when the safe designation of the ECU is determined to be Non-Safe-Perf.

In some examples, the safe designation 406/412 may be determined based on the ECU policies (e.g., drive-mode policies, park-mode policies, application policies, SoC operation stage policies, vehicle occupant interaction, and TDP budget distribution) specified for the ECU by the OEM. For example, the ECU policies may statically define a safe designation based on a drive mode state or SoC operation stage state. In some examples, the safe designation 406/412 may further be determined, for example, based on the workload running on the ECU. For example, the safe designation may be dynamically determined based on the workload scheduled at a boundary between two different drive mode states and/or two different SoC operation stage states.

Figure 5:
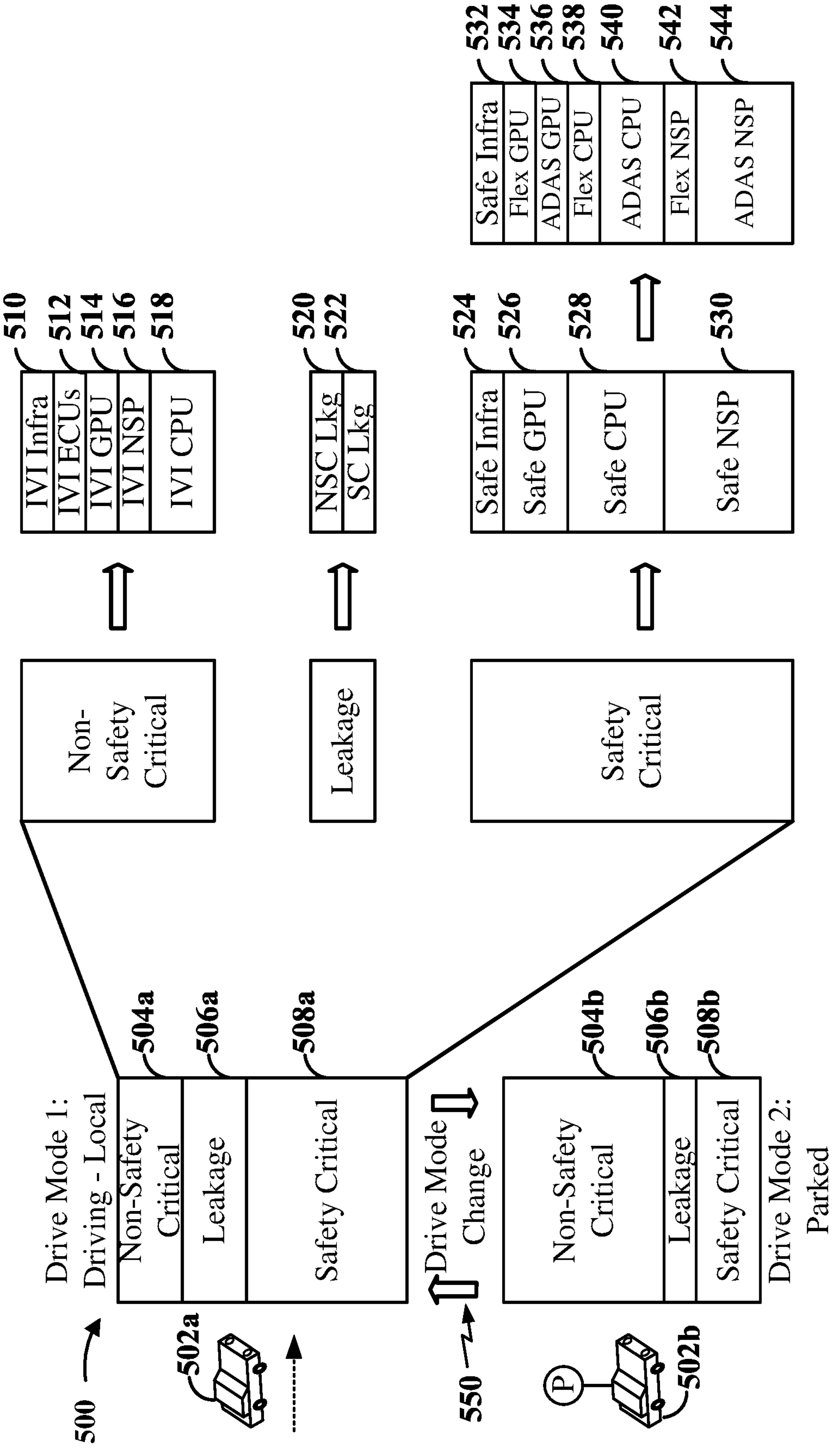
FIG. 5 is a diagram illustrating an example of an SoC flex operation at drive mode boundaries according to some aspects.

FIG. 5 is a diagram illustrating an example of an SoC flex operation at drive mode boundaries according to some aspects. In FIG. 5, an SoC TDP budget 500 is illustrated as being shared between various workloads for a first drive mode 502*a* and a second drive mode 502*b*. The first drive mode 502*a* (e.g., Drive Mode 1) may correspond to a driving mode of the vehicle in which the vehicle is driving on local streets. In this first drive mode 502*a*, a larger portion of the TDP budget is allocated to safety critical (mission critical) workloads 508*a* than non-safety critical (discretionary) workloads 504*a*. In addition, a portion of the TDP budget is spent on leakage power 506*a* resulting from inefficient usage of power (e.g., based on the power management, such as power and limit features, applied to the ECUs on the SoC). The non-safety critical workloads 504*a* may be running on, for example, infrastructure 510, various IVI ECUs 512, an IVI GPU 514, an IVI NSP 516, and an IVI CPU 518. The leakage 506*a* may include, for example, non-safety critical leakage 520 and safety critical leakage 522. The safety critical workloads 508*a* may be running on, for example, safe infrastructure 524 (e.g., including safe infrastructure 532), safe GPUs 526 (e.g., including a mixed critical/flex GPU 534 and an ADAS GPU 536), safe CPUs 528 (e.g., including a mixed critical/flex CPU 538 and an ADAS CPU 540), and safe NSPs 530 (e.g., including a mixed critical/flex NSP 542 and an ADAS NSP 544).

The second drive mode 502*b* (e.g., Drive Mode 2) may correspond to a parked mode of the vehicle. In this second drive mode 502*b*, a larger portion of the TDP budget may be allocated to non-safety critical workloads 504*b* than safety critical workloads 508*b*. In addition, a portion of the TDP budget in the second drive mode 502*b* is also spent on leakage 506*b*. By flexibly allocating the TDP budget to safety critical and non-safety critical workloads based on a drive mode state change 550 between the first drive mode 502*a* and the second drive mode 502*b*, the TDP budget may be controlled, leveraging thermal gradients and allowing throttling and limiting where appropriate (e.g., for discretionary workloads). For example, the TDP budget may first be allocated to the safety critical workloads 508*a*/508*b*, and then the remaining TDP budget may be shared among the non-safety critical workloads 504*a*/504*b* with corresponding power and limit features applied. As a result, SoC performance and power efficiency may be enhanced.

To enable the flexible allocation of TDP budget, the different ECUs may be re-assigned or re-classified to different workloads at the boundary between drive mode states. In an example, in the second drive mode 502*b*, a CPU cluster may be allocated to a gaming workload (IVI CPU), which is a non-safety critical workload 504*b*. When the vehicle is put into drive (e.g., at the boundary between Drive Mode 2 and Drive Mode 1), the CPU cluster may be re-allocated to support an ADAS workload (ADAS CPU), which is a safety critical workload 508*a*. As a result of the re-allocation of the CPU cluster, the power and limits features configuration applied to the CPU cluster may change. In some examples, leakage power (e.g., leakage 520/522) is non-linear with temperature, and as a result, power management features that allow for more aggressive management of temperature for safe designated ECUs than non-safe designated ECUs may result in improved system performance under a constrained power budget for safe designated ECUs. Prior to activating the CPU cluster for safe power management, while still in non-safety operation, the software (e.g., APSS) may generate and configure the updated power and limits features for the CPU cluster. The updated configuration may then be loaded into the CPU cluster.

In another example, in the first drive mode 502*a*, a GPU cluster may be allocated to an ADAS/multi-media workload, which is a safety critical workload 508*a*. When the vehicle is put into park (e.g., at the boundary between Drive Mode 1 and Drive Mode 2), the GPU cluster may be re-allocated to support a gaming workload (IVI GPU), which is a non-safety critical workload 504*a*. As a result of the re-allocation of the GPU cluster, the power and limits features configuration applied to the GPU cluster may change. Prior to activating the GPU cluster for non-safety power management, while still in safety operation, the software (e.g., APSS) may generate and configure the updated power and limits features for the GPU cluster (e.g., power budget control (TDP limit) and any resulting throttling and limiting configuration). The updated configuration may then be loaded into the GPU cluster.

Figure 6:
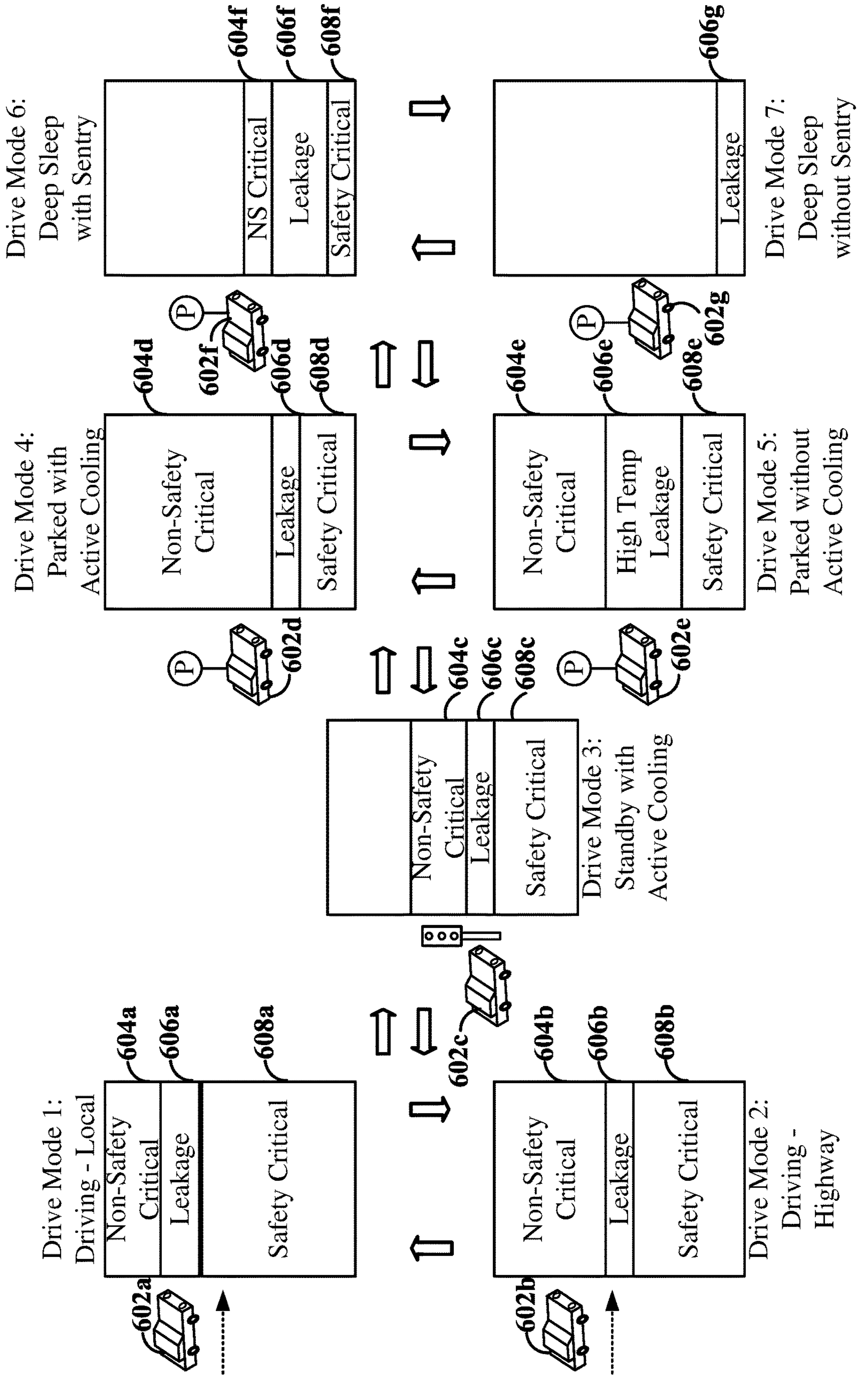
FIG. 6 is a diagram illustrating another example of an SoC flex operation at drive mode boundaries according to some aspects.

FIG. 6 is a diagram illustrating another example of an SoC flex operation at drive mode boundaries according to some aspects. In FIG. 6, an SoC TDP budget is illustrated as being shared between various workloads for different drive modes 602*a*-602*g* of a vehicle (e.g., an electric vehicle (EV)). For example, a first drive mode 602*a* (e.g., Drive Mode 1) may correspond to a driving mode of the vehicle in which the vehicle is driving on local streets. In this first drive mode 602*a*, a larger portion of the TDP budget is allocated to safety critical (mission critical) workloads 608*a* than non-safety critical (discretionary) workloads 604*a*. In addition, a portion of the TDP budget is spent on leakage 606*a*. A second drive mode 602*b* (e.g., Drive Mode 2) may correspond to a driving mode of the vehicle in which the vehicle is driving on the highway. In this second drive mode 602*b*, the TDP budget is allocated equally to safety critical (mission critical) workloads 608*b* and non-safety critical (discretionary) workloads 604*b*, while a portion is still spent on leakage 606*b*.

A third drive mode 602*c* (e.g., Drive Mode 3) may correspond to a standby mode of the vehicle with active cooling of the vehicle. In this third drive mode 602*c*, the TDP budget is allocated equally to safety critical (mission critical) workloads 608*c* and non-safety critical (discretionary) workloads 604*c*, while a portion is still spent on leakage 606*c*. However, not all of the TDP budget is needed for the running workloads and therefore, not all of the TDP budget is allocated. A fourth drive mode 602*d* (e.g., Drive Mode 4) may correspond to a parked mode of the vehicle with active cooling of the vehicle. In this fourth drive mode 602*d*, a larger portion of the TDP budget may be allocated to non-safety critical workloads 604*d* than safety critical workloads 608*d* with a portion of the TDP budget being spent on leakage 606*d*.

A fifth drive mode 602*e* (e.g., Drive Mode 5) may correspond to a parked mode of the vehicle without active cooling. In this fifth drive mode 602*e*, a larger portion is spent on leakage 606*e* without the active cooling. A sixth drive mode 602*f* may correspond to a deep sleep mode of the vehicle with the surveillance mode activated. In this sixth drive mode 602*f*, the TDP budget allocated to safety critical (mission critical) workloads 608*f* and non-safety critical (discretionary) workloads 604*f* are greatly reduced, with a relative larger portion spent on leakage 606*f* for the surveillance mode. However, not all of the TDP budget is needed for the running workloads and therefore, not all of the TDP budget is allocated. A seventh drive mode 602*g* (e.g., Drive Mode 7) may correspond to a deep sleep mode of the vehicle without the surveillance mode being activated. In this seventh drive mode 602*g*, no TDP budget is allocated to safety/non-safety critical workloads. Instead, a small portion is spent on leakage 606*g*.

At the boundary between each drive mode state change, the TDP budget may first be allocated to the safety critical workloads, and then the remaining TDP budget may be shared among the non-safety critical workloads with corresponding power and limit features applied. In this way, the TDP power budget may be controlled, thereby maximizing performance within a constrained TDP budget of the SoC.

Figure 7:
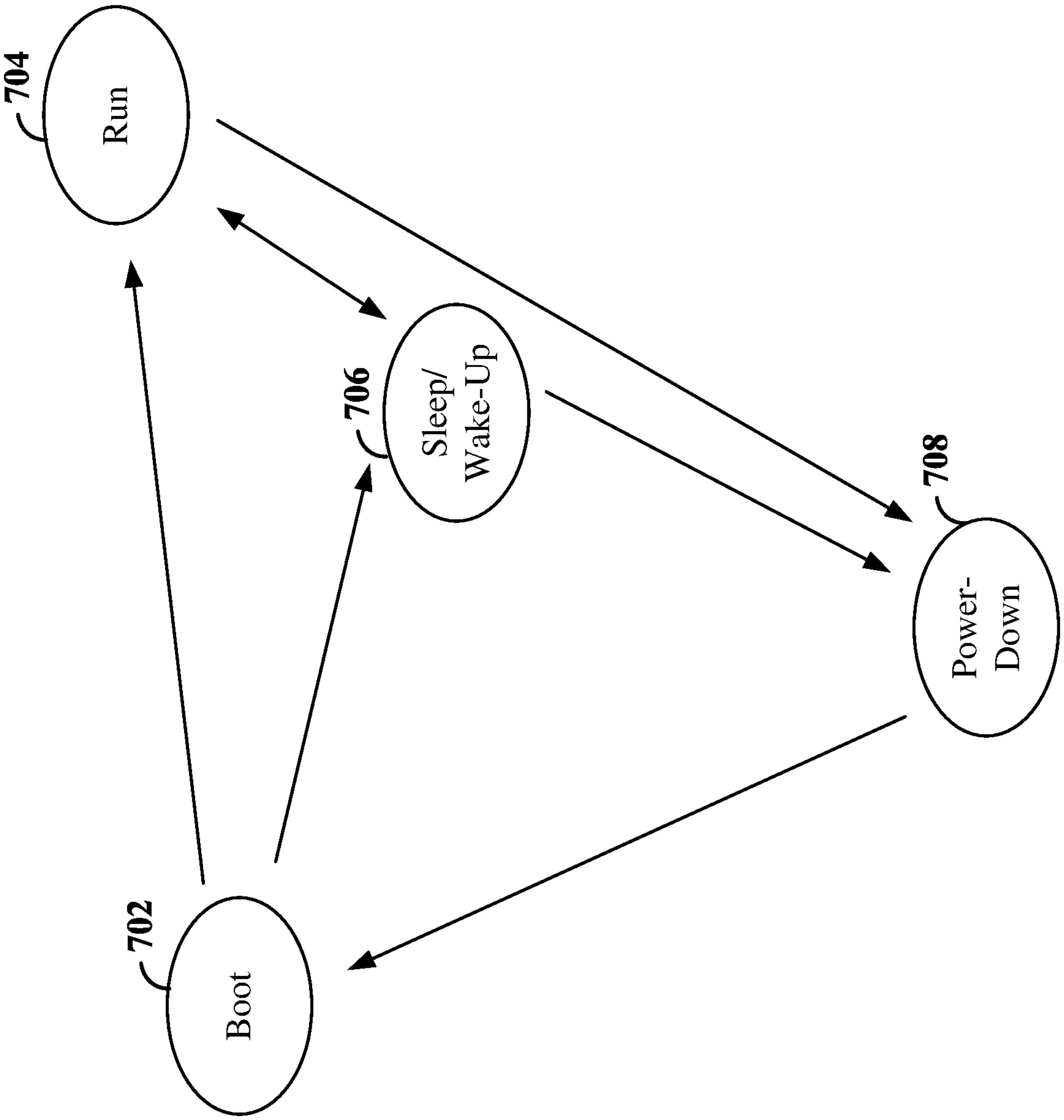
FIG. 7 is a diagram illustrating exemplary SoC operating stages according to some aspects.

FIG. 7 is a diagram illustrating exemplary SoC operating stages according to some aspects. As shown in FIG. 7, SoC operating stages may include, for example, boot 702, run (normal operation) 704, sleep/wake-up 706, and power-down 708. At the boundary between each SoC operation stage state change, the safe designation of each of the ECUs on the SoC may be updated based on, for example, ECU policies associated with each of the ECUs and/or the workload configured to run on each of the ECUs. For example, an ECU policy of a particular ECU may indicate the ECU should be designated as safety critical while in the run stage 704, but designated as non-safety critical while in the boot stage 702, sleep/wake-up stage 706 and/or power-down stage 708. In another example, an ECU may be re-allocated to a different workload at a boundary between SoC operation stages, and the safe designation of the ECU may be updated based on the safe designation associated with the workload (e.g., the safe designation of the VM that scheduled the workload).

Figure 8:
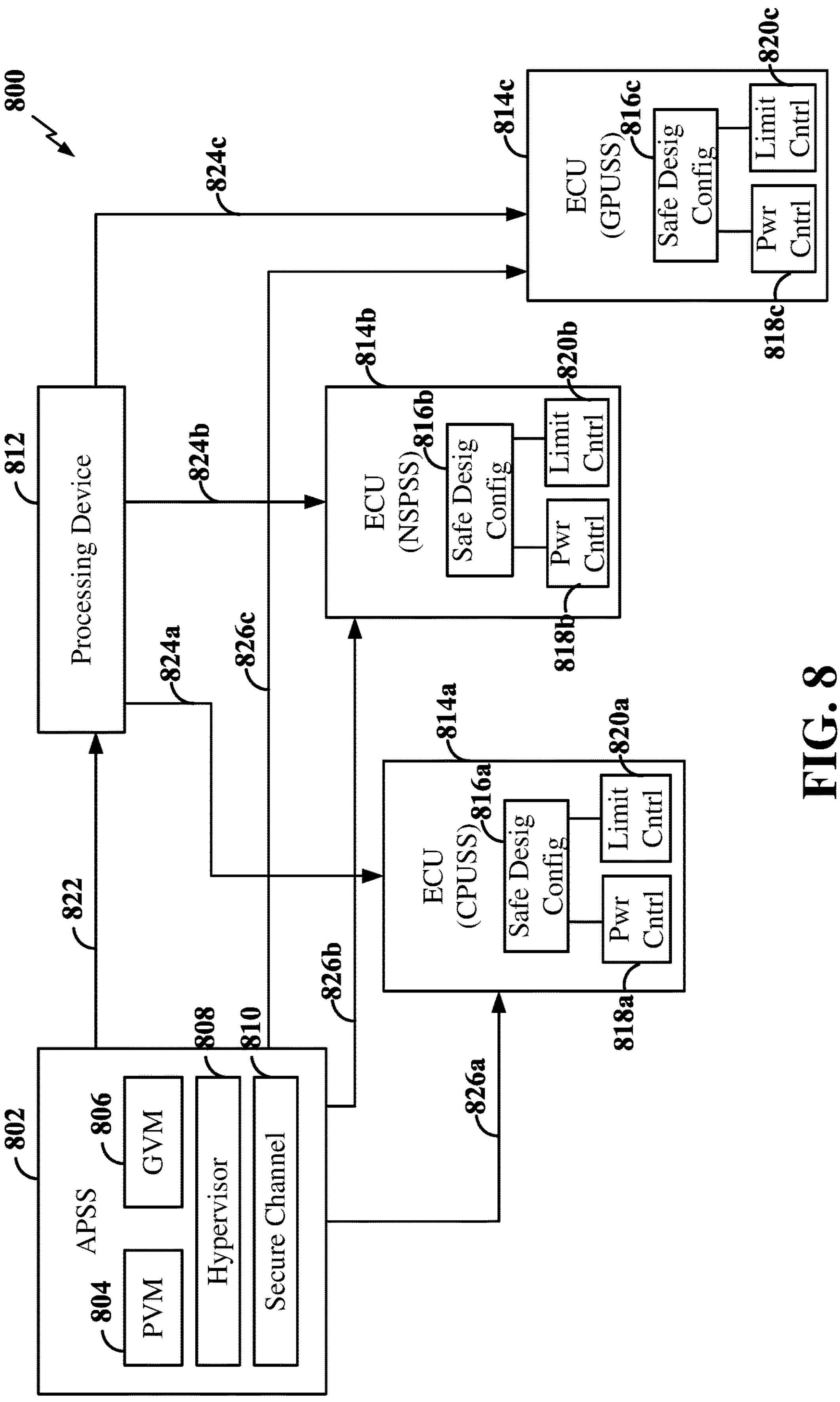
FIG. 8 is a diagram illustrating an example of an SoC including a software architecture and framework for configuring safe designations in flex mode according to some aspects.

FIG. 8 is a diagram illustrating an example of an SoC including a software architecture and framework for configuring safe designations in flex mode according to some aspects. The SoC 800 includes an application layer subsystem (APSS) 802, a processing device 812, and a plurality of ECUs 814*a*, 814*b*, and 814*c*. The ECUs may include, for example, a CPU subsystem (SS) 814*a* (e.g., a CPU cluster), an NSPSS 814*b* (e.g., an NSP cluster), and a GPUSS 814*c* (e.g., a GPU cluster). The APSS 802 may be executable, for example, by the controller 108 shown in FIG. 1. For example, the APSS 802 may be executable by a processor (e.g., a general-purpose processor or digital signal processor) of the controller on the SoC 800. The processing device 812 may be configured to control the TDP budget of the SoC 800. In some examples, the processing device 812 may be a separate general-purpose processor or microcontroller of the controller on the SoC 800 or a separate ECU.

The APSS 802 may include a HLOS that communicates with one or more virtual machines (e.g., primary virtual machine (PVM) 804 and guest virtual machine (GVM) 806) via a hypervisor 808. The hypervisor 808 may map VMs 804 and 806 to physical SoC hardware (e.g., ECUs 814*a*, 814*b*, and 814*c*). The VMs 804 and 806 may then schedule workloads to be run on the mapped ECUs 814*a*, 814*b*, 814*c*.

The APSS/HLOS 802 may further be configured to identify a respective safe designation for each ECU 814*a*, 814*b*, and 814*c* and generate a respective configuration 816*a*-816*c* of one or more power features and/or one or more limit features for each of the ECUs 814*a*, 814*b*, and 814*c* based on respective ECU policies and hardware constraints. For example, the APSS/HLOS 802 may determine the power and limit features for a particular ECU 814*a* based on the safe designation of that ECU 814*a*, where those power and limit features may be constrained by the hardware FuSa qualifications of the ECU 814*a*.

In some examples, the APSS/HLOS 802 may identify the respective safe designation for each of the ECUs 814*a*-814*c* based on a drive mode of a vehicle containing the SoC 800 and/or an SoC operation stage of the SoC 800. For example, the APSS/HLOS 802 may access respective ECU policies (e.g., which may be stored, for example, in memory 110 shown in FIG. 1) for each of the ECUs to determine a respective safe designation for each of the ECUs for each drive mode and/or SoC operation stage. The APSS/HLOS 802 may then identify the safe designation for an ECU (e.g., ECU 814*a*) corresponding to the current drive mode and/or SoC operation stage. The APSS/HLOS 802 may further generate a respective configuration of one or more power features and/or one or more limit features for each of the safe designations of each of the ECUs based on ECU policies. For example, the APSS/HLOS 802 may statically generate the ECU configurations offline for each of the safe designations of an ECU (e.g., ECU 814*a*) based on the ECU policies and then select the ECU configuration for an ECU based on the identified safe designation of that ECU.

In other examples, the APSS/HLOS 802 may identify a respective safe designation for each of the ECUs based on the respective workload associated with (scheduled/running on) each of the ECUs 814*a*-814*c* and respective ECU policies. For example, the safe designation of a workload may be identified based on the safe designation of the VM that scheduled the workload. The workload safe designation may then be applied to the ECU (e.g., ECU 814*a*) running that workload in accordance with ECU policies that allow that safe designation. The APSS/HLOS 802 may further generate a respective configuration of power features and/or limit features for each of the ECUs 814*a*-814*c* based on respective ECU policies and the identified respective safe designations. At the boundary between drive modes and/or SoC operation stages, the hypervisor 808 may re-allocate an ECU (e.g., ECU 814*a*) to a different workload/VM 804/806. The APSS/HLOS 802 may then update the safe designation of the ECU 814*a* based on the different workload and ECU policies and generate a new configuration of power and/or limit features for the ECU 814*a* based on the updated safe designation and ECU policies.

The APSS/HLOS 802 may then provide the respective safe designation and associated configuration 816*a*-816*c* for each of the ECUs 814*a*-814*c* to the processing device 812 via software communication interface 822. The processing device 812 may then load the respective safe designations and corresponding configurations 816*a*-816*c* into the appropriate ECUs 814*a*-814*c* via respective software communication interfaces 824*a*-824*c*. The processing device 812 may further be configured to calculate the redistribution of the TDP budget to each of the ECUs 814*a*-814*c* based on the respective safe designations and associated configurations of each of the ECUs 814*a*-814*c*. For example, the processing device 812 may distribute the respective TDP limits to each of the ECUs 814*a*-814*c* via the same software communication interfaces 824*a*-824*c* used to provide the safe designations and corresponding configurations. In some examples, the APSS/HLOS 802 may load the respective safe designations and corresponding configurations 816*a*-816*c* directly into each of the ECUs 814*a*-814*c* without first providing the safe designations and corresponding configurations to the processing device 812.

In some examples, the APSS/HLOS 802 may distribute the respective safe designations and associated configurations to each of the ECUs 814*a*-814*c* through the hypervisor 808 via a secure channel 810. The secure channel 810 may be configured to prevent hacking of the safe designations and associated configurations, which could lead to an SoC crash due to performance or thermal implications. The secure channel 810 may be implemented using any suitable secure design.

The APSS/HLOS 802 may further manage power to each of the ECUs 814*a*-814*c* via respective power management software communication interfaces 826*a*-826*c*. For example, the APSS/HLOS 802 may configure the RMU 114 shown in FIG. 1 to manage power to each of the ECUs 814*a*-814*c* based on the respective safe designations and corresponding configurations 816*a*-816*c*. In addition, each of the ECUs 814*a*-814*c* may utilize the respective safe designation and corresponding configuration 816*a*-816*c* and power management features provided by the APSS/HLOS 802 via the power management software communication interfaces 826*a*-826*c* to set respective power controls 818*a*-818*c* (e.g., thresholds) and limit controls 820*a*-820*c* (e.g., thresholds) for the respective ECU 814*a*-814*c* and communicate with the APSS/HLOS 802 and/or RMU to manage power to the respective ECU based on the power and limit controls.

Figure 9:
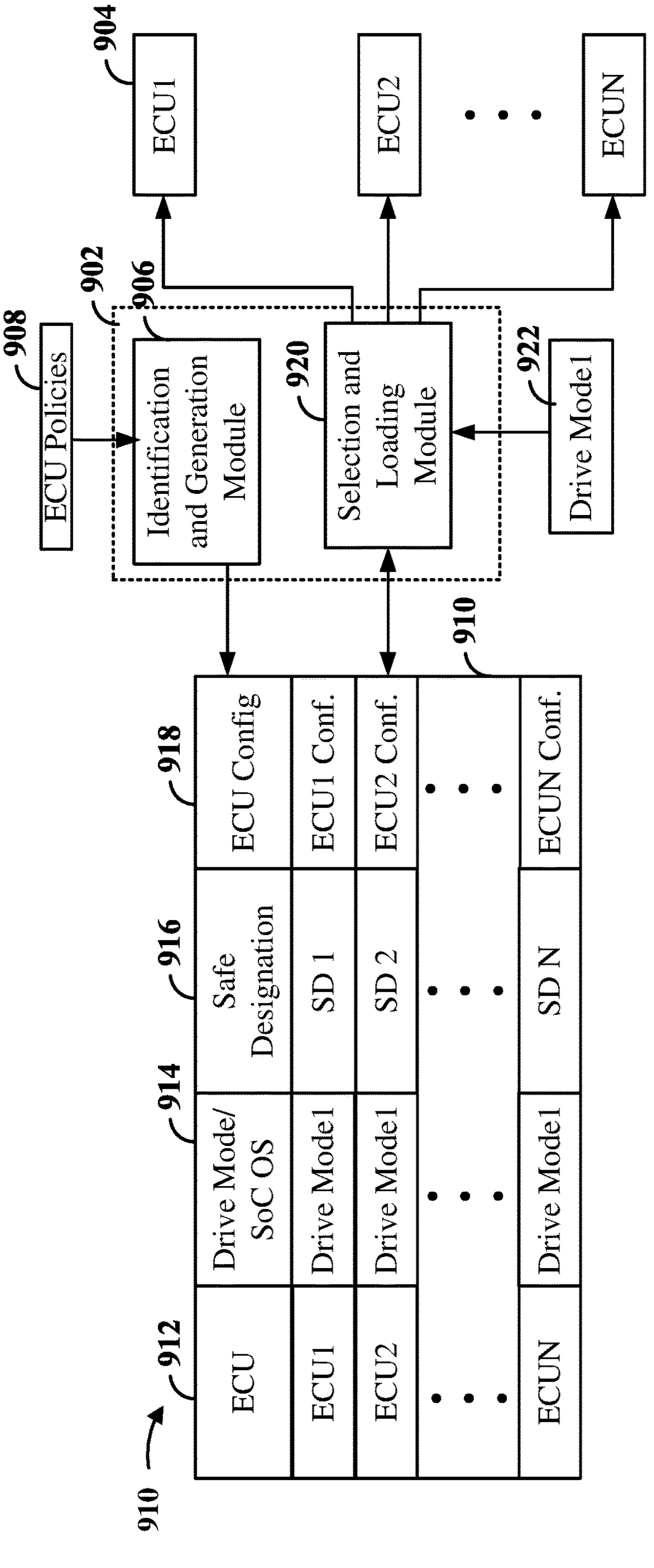
FIG. 9 is a diagram illustrating an example of static generation of safe designation configurations according to some aspects.

FIG. 9 is a diagram illustrating an example of static generation of safe designation configurations according to some aspects. An application layer (e.g., APSS/HLOS) 902 includes an identification and generation module 906 (e.g., software module) configured to access ECU policies 908 for each of a plurality of ECUs 904 (e.g., ECU1, ECU2, . . . , ECUN). The ECU policies 908 may be stored, for example, in memory 110 shown in FIG. 1. For each ECU 904, the identification and generation module 906 is configured to generate a respective safe designation 916 (e.g., SD1, SD2, . . . , SDN) and associated/corresponding configuration 918 (ECU1 Config., ECU2 Config., . . . , ECUN Config.) of one or more power features and/or one or more limit features for each possible drive mode of the vehicle and/or SoC operation stage 914 of the SoC based on the ECU policies 908. The identification and generation module 906 is further configured to statically generate (e.g., generate at boot-up (e.g., not during runtime)) a table 910 including ECU identifiers 912 for each of the ECUs, drive mode/SoC operating stages 914, and the respective safe designation 916 and associated/corresponding ECU configuration 918 for each possible drive mode and/or SoC operation stage 914 for each ECU. In the example shown in FIG. 9, the table 910 includes the safe designation 916 and corresponding ECU configuration 918 for a single drive mode (e.g., Drive Mode 1) for each ECU 912, for simplicity.

The application layer 902 further includes a selection and loading module 920 (e.g., software module) that is configured to receive a current drive mode and/or SoC operation stage (e.g., Drive Mode 1) 922 of the vehicle/SoC. Based on the current drive mode (Drive Mode 1) 922, the selection and loading module 920 may access the table 910 to retrieve the respective safe designation 916 and corresponding configuration 918 for each of the ECUs 912 for the current drive mode 922. The selection and loading module 920 may then be configured to load the respective safe designation 916 and corresponding configuration 918 into each of the ECUs 904.

Figure 10:
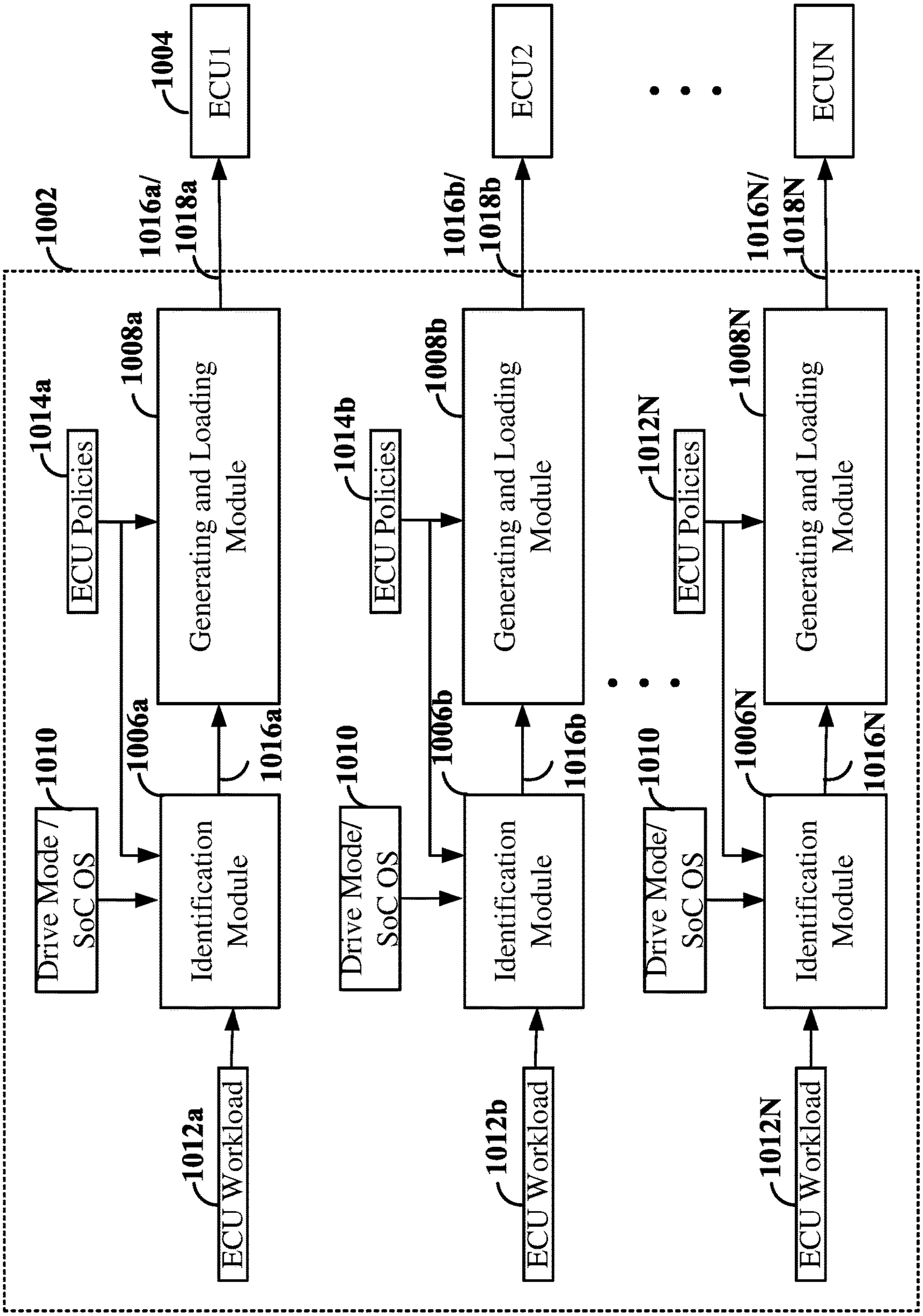
FIG. 10 is a diagram illustrating an example of dynamic generation of safe designation configurations according to some aspects.

FIG. 10 is a diagram illustrating an example of dynamic generation of safe designation configurations according to some aspects. An application layer (e.g., APSS/HLOS) 1002 includes identification modules 1006*a*, 1006*b*, . . . , 1006N (e.g., software modules) configured to identify a respective safe designation 1016*a*, 1016*b*, . . . 1016N for each of a plurality of ECUs 1004 (e.g., ECU1, ECU2, . . . , ECUN). The identification modules 1006*a*, 1006*b*, . . . 1006N are each configured to identify the respective safe designation 1016*a*, 1016*b*, . . . , 1016N at boundaries between drive mode/SoC operation stages 1010 based on the respective ECU workload 1012*a*, 1012*b*, . . . , 1012N scheduled on the ECU 1004 for the new drive mode/SoC operation stage 1010 and respective ECU policies 1014*a*, 1014*b*, . . . , 1014N associated with that ECU 1004. For example, an ECU (e.g., ECU1) may be re-allocated from running a safety critical workload to running a non-safety critical workload 1012*a* at the boundary between a highway driving mode and a parked mode (e.g., new drive mode 1010) of the vehicle. As another example, an ECU (e.g., ECU2) may be scheduled to run a safety critical workload 1012*b* at the boundary between a sleep state of the SoC (e.g., associated with a non-safe designation of the ECU2) and a run state of the SoC (e.g., new SoC operation stage).

The application layer 1002 further includes generating and loading modules 1008*a*, 1008*b*, . . . , 1008N (e.g., software modules) that are configured to receive the respective safe designations 1016*a*, 1016*b*, . . . , 1016N of each of the ECUs 1004. The generate and loading modules 1008*a*, 1008*b*, . . . , 1008N are further configured to generate a respective ECU configuration 1018*a*, 1018*b*, . . . , 1018N for each of the ECUs 1004 based on respective ECU policies 1014*a*, 1014*b*, . . . , 1014N for each of the ECUs 1004. Each respective ECU configuration 1018*a*, 1018*b*, . . . , 1018N may include a respective configuration of one or more power features and/or one or more limit features. The generate and loading modules 1008*a*, 1008*b*, . . . , 1008N are further configured to load the respective safe designations 1016*a*, 1016*b*, . . . , 1016N and corresponding configurations 1018*a*, 1018*b*, . . . , 1018N into each of the ECUs 1004.

Figure 11:
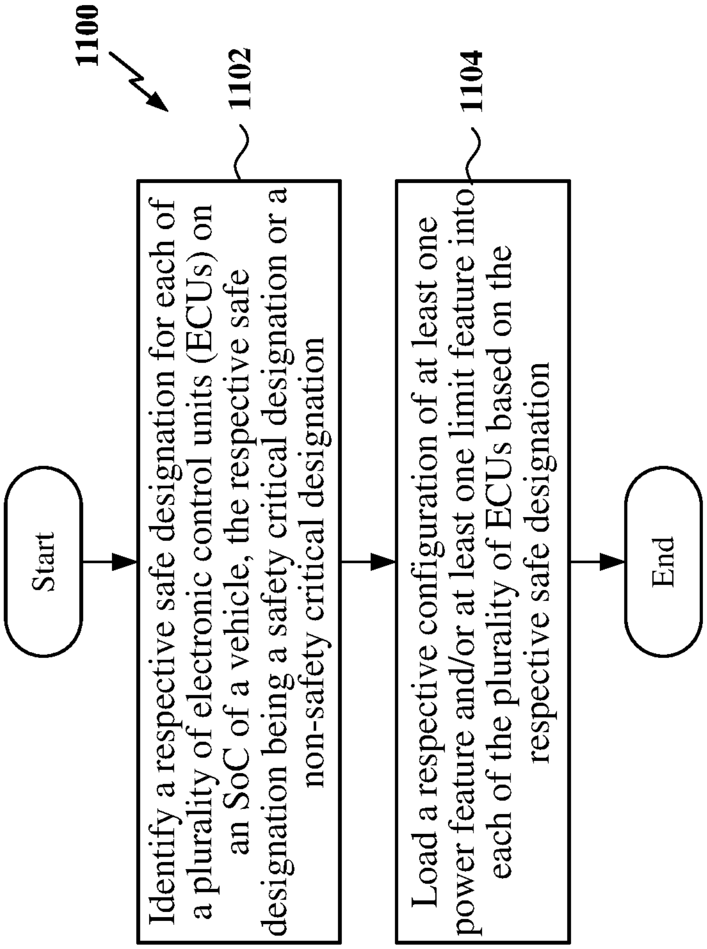
FIG. 11 is a flow chart illustrating another exemplary process for safe designation for SoC power management according to some aspects.

FIG. 11 is a flow chart illustrating an exemplary process 1100 for safe designation for SoC power management according to some aspects. As described below, some or all illustrated features may be omitted in a particular implementation within the scope of the present disclosure, and some illustrated features may not be required for implementation of all embodiments. In some examples, the process 1100 may be carried out by the controller 108 on the SoC 102 illustrated in FIG. 1. In some examples, the process 1100 may be carried out by any suitable apparatus or means for carrying out the functions or algorithm described below.

At block 1102, the process begins with identifying a respective safe designation for each of a plurality of electronic control units (ECUs) on an SoC of a vehicle. The respective safe designation may be one of a safety critical designation or a non-safety critical designation. In some examples, a first ECU of the plurality of ECUs on the SoC is configured to run a first workload with the safety critical designation and a second ECU of the plurality of ECUs on the SoC is configured to run a second workload with the non-safety critical designation. In some examples, at least one of the safety critical designation or the non-safety critical designation includes performance requirements related to run-time deadlines. In some examples, an ECU of the plurality of ECUs includes a cluster of multiple ECUs of a same type. For example, the controller 108 and memory 110 shown and described above in connection with FIG. 1, the APSS 802 shown and described above in connection with FIG. 8, the identification and generation module 906 shown and described above in connection with FIG. 9, and/or the identification module(s) 1006*a*-1006N shown and described above in connection with FIG. 10 may provide a means to identify the respective safe designations.

At block 1104, the process continues with loading a respective configuration of at least one of a power feature or a limit feature into each of the plurality of ECUs based on the respective safe designation. In some examples, the respective configuration is based on a respective original equipment manufacturer (OEM) configuration for each of the safety critical designation and the non-safety critical designation for each of the plurality of ECUs. In some examples, the power feature includes one or more of an active power feature or an idle power feature, and the limit feature includes one or more of a temperature limit, a power limit, a current limit, a voltage limit, or a thermal design power (TDP) limit. For example, the controller 108 and memory 110 shown and described above in connection with FIG. 1, the APSS 802 and processing device 812 shown and described above in connection with FIG. 8, the selection and loading module 920 shown and described above in connection with FIG. 9, and/or the generate and loading module(s) 1008*a*-1008N shown and described above in connection with FIG. 10 may provide a means to load the respective configurations.

Figure 12:
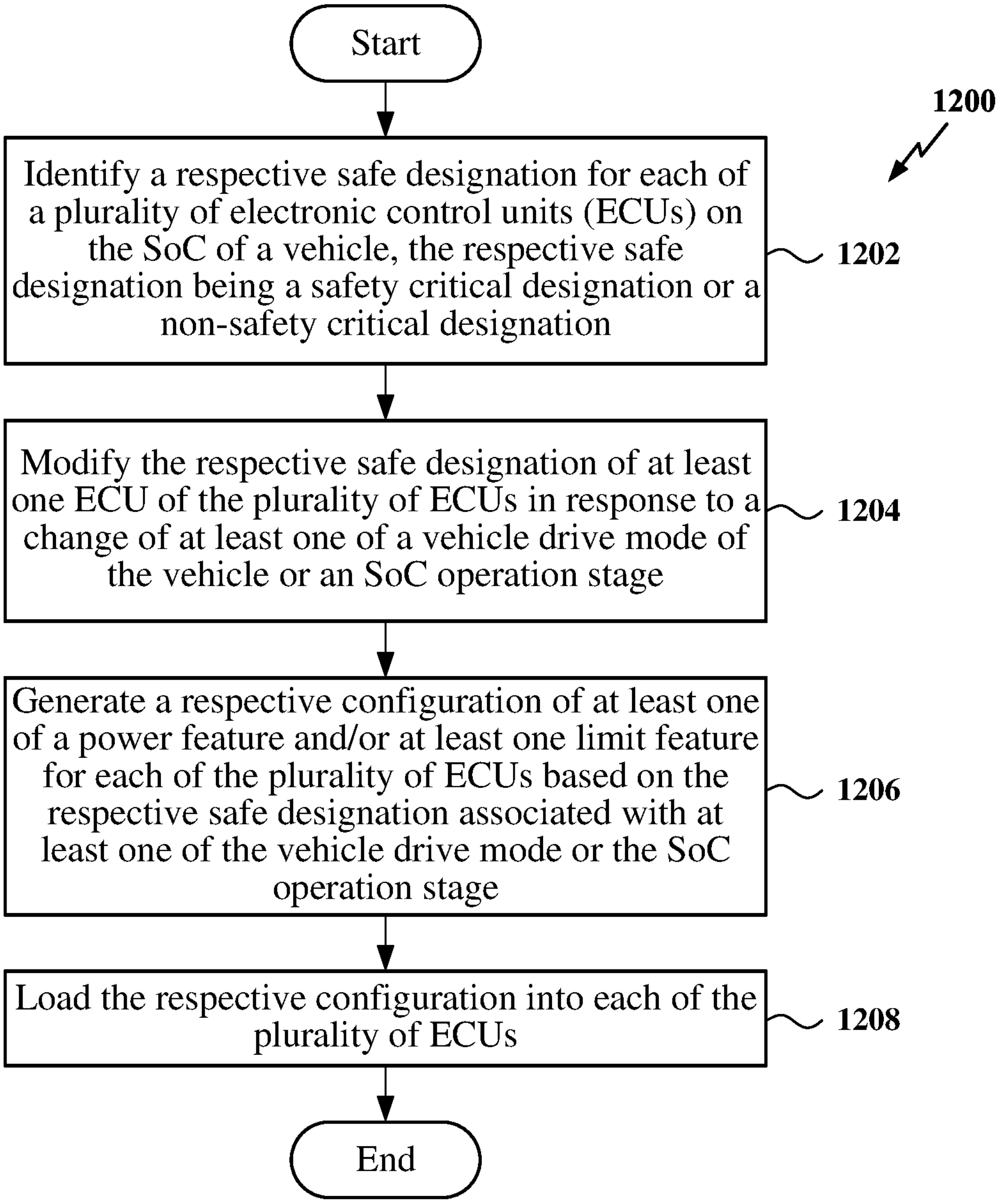
FIG. 12 is a flow chart illustrating another exemplary process for safe designation for SoC power management according to some aspects.

FIG. 12 is a flow chart illustrating another exemplary process 1200 for safe designation for SoC power management according to some aspects. As described below, some or all illustrated features may be omitted in a particular implementation within the scope of the present disclosure, and some illustrated features may not be required for implementation of all embodiments. In some examples, the process 1200 may be carried out by the controller 108 on the SoC 102 illustrated in FIG. 1. In some examples, the process 1200 may be carried out by any suitable apparatus or means for carrying out the functions or algorithm described below.

At block 1202, the process begins with identifying a respective safe designation for each of a plurality of electronic control units (ECUs) on an SoC of a vehicle. The respective safe designation may be one of a safety critical designation or a non-safety critical designation. In some examples, a first ECU of the plurality of ECUs on the SoC is configured to run a first workload with the safety critical designation and a second ECU of the plurality of ECUs on the SoC is configured to run a second workload with the non-safety critical designation. In some examples, at least one of the safety critical designation or the non-safety critical designation includes performance requirements related to run-time deadlines. In some examples, an ECU of the plurality of ECUs includes a cluster of multiple ECUs of a same type. For example, the controller 108 and memory 110 shown and described above in connection with FIG. 1, the APSS 802 shown and described above in connection with FIG. 8, the identification and generation module 906 shown and described above in connection with FIG. 9, and/or the identification module(s) 1006*a*-1006N shown and described above in connection with FIG. 10 may provide a means to identify the respective safe designations.

At block 1204, the process continues with modifying the respective safe designation of at least one ECU of the plurality of ECUs in response to a change of at least one of a vehicle drive mode of the vehicle or an SoC operation stage. In some examples, the SoC operation stage includes one of a boot stage, a run stage, a sleep stage, or a power-down stage. In some examples, the vehicle drive mode includes one of a parked mode, a stopped mode, or a driving mode, each associated with cooling or without cooling of the vehicle. For example, the controller 108 and memory 110 shown and described above in connection with FIG. 1, the APSS 802 shown and described above in connection with FIG. 8, the identification and generation module 906 shown and described above in connection with FIG. 9, and/or the identification module(s) 1006*a*-1006N shown and described above in connection with FIG. 10 may provide a means to modify the respective safe designations.

At block 1206, the process continues with generating a respective configuration of at least one of a power feature or a limit feature for each of the plurality of ECUs based on the respective safe designation associated with at least one of the vehicle drive mode or the SoC operation stage. In some examples, the respective configuration for each of the plurality of ECUs may be statically generated based on a respective original equipment manufacturer (OEM) safe designation associated with at least one of the vehicle drive mode or the SoC operation stage for each of the ECUs. In some examples, the respective configuration for each of the plurality of ECUs may be dynamically generated based on a respective workload running on each of the plurality of ECUs at a boundary between respective SoC operation stages or respective vehicle drive modes, the respective workload being associated with one of the safety critical designation or the non-safety critical designation.

In some examples, the respective configuration is based on a respective original equipment manufacturer (OEM) configuration for each of the safety critical designation and the non-safety critical designation for each of the plurality of ECUs. In some examples, the power feature includes one or more of an active power feature or an idle power feature, and the limit feature includes one or more of a temperature limit, a power limit, a current limit, a voltage limit, or a thermal design power (TDP) limit. For example, the controller 108 and memory 110 shown and described above in connection with FIG. 1, the APSS 802 shown and described above in connection with FIG. 8, the identification and generation module 906 shown and described above in connection with FIG. 9, and/or the generate and loading module(s) 1008*a*-1008N shown and described above in connection with FIG. 10 may provide a means to generate the respective configurations.

At block 1208, the process continues with loading the respective configuration into each of the plurality of ECUs. In some examples, the respective configuration for each of the plurality of ECUs is distributed from an application layer to the plurality of ECUs via a secure channel. In some examples, a processing device may receive the respective safe designation and the respective configuration for each of the plurality of ECUs and load the respective safe designation and the respective configuration into each of the plurality of ECUs. In addition, the processing device may allocate a respective thermal design power (TDP) budget to each of the plurality of ECUs based on the respective configuration for each of the plurality of ECUs. For example, the controller 108 and memory 110 shown and described above in connection with FIG. 1, the APSS 802 and processing device 812 shown and described above in connection with FIG. 8, the selection and loading module 920 shown and described above in connection with FIG. 9, and/or the generate and loading module(s) 1008*a*-1008N shown and described above in connection with FIG. 10 may provide a means to load the respective configurations.

In one configuration, an apparatus includes means for identifying a respective safe designation for each of a plurality of electronic control units (ECUs) on an SoC of a vehicle, the respective safe designation being a safety critical designation or a non-safety critical designation, and means for loading a respective configuration of at least one of a power feature or a limit feature into each of the plurality of ECUs based on the respective safe designation. In one aspect, the aforementioned means may be the controller 108 and memory 110 shown in FIG. 1 and/or the APSS 802 and processing device 812 configured to perform the functions recited by the aforementioned means. In another aspect, the aforementioned means may be a circuit or any apparatus configured to perform the functions recited by the aforementioned means.

Of course, in the above examples, the controller is merely provided as an example, and other means for carrying out the described functions may be included within various aspects of the present disclosure, including any other suitable apparatus or means described in any one of the FIGS. 1, 8, 9, and/or 10, and utilizing, for example, the processes and/or algorithms described herein in relation to FIGS. 11 and/or 12.

The following provides an overview of aspects of the present disclosure:

Aspect 1: A method of safe designation on a system-on-chip (SoC), the method comprising: identifying a respective safe designation for each of a plurality of electronic control units (ECUs) on the SoC of a vehicle, the respective safe designation for each of the plurality of ECUs comprising a safety critical designation or a non-safety critical designation; and loading a respective configuration of at least one power feature, at least one limit feature, or a combination of the at least one power feature and the at least one limit feature into each of the plurality of ECUs based on the respective safe designation comprising the safety critical designation or the non-safety critical designation.

Aspect 2: The method of aspect 1, wherein a first ECU of the plurality of ECUs on the SoC is configured to run a first workload with the safety critical designation and a second ECU of the plurality of ECUs on the SoC is configured to run a second workload with the non-safety critical designation.

Aspect 3: The method of aspect 1 or 2, wherein the respective configuration is based on a respective original equipment manufacturer (OEM) configuration for each of the safety critical designation and the non-safety critical designation for each of the plurality of ECUs.

Aspect 4: The method of any of aspects 1 through 3, wherein at least one of the safety critical designation or the non-safety critical designation comprises performance requirements related to run-time deadlines.

Aspect 5: The method of any of aspects 1 through 4, further comprising: modifying the respective safe designation of at least one ECU of the plurality of ECUs in response to a change of at least one of a vehicle drive mode of the vehicle or an SoC operation stage.

Aspect 6: The method of aspect 5, wherein the SoC operation stage comprises one of a boot stage, a run stage, a sleep stage, or a power-down stage.

Aspect 7: The method of aspect 5, wherein the vehicle drive mode comprises one of a parked mode, a stopped mode, or a driving mode, each associated with cooling or without cooling of the vehicle.

Aspect 8: The method of any of aspects 5 through 7, further comprising: generating the respective configuration for each of the plurality of ECUs based on the respective safe designation associated with at least one of the vehicle drive mode or the SoC operation stage.

Aspect 9: The method of aspect 8, further comprising: statically generating the respective configuration for each of the plurality of ECUs based on a respective original equipment manufacturer (OEM) safe designation associated with at least one of the vehicle drive mode or the SoC operation stage for each of the ECUs.

Aspect 10: The method of aspect 8, further comprising: dynamically generating the respective configuration for each of the plurality of ECUs based on a respective workload running on each of the plurality of ECUs at a boundary between respective SoC operation stages or respective vehicle drive modes, the respective workload being associated with one of the safety critical designation or the non-safety critical designation.

Aspect 11: The method of any of aspects 8 through 10, further comprising: distributing the respective configuration for each of the plurality of ECUs from an application layer to the plurality of ECUs via a secure channel.

Aspect 12: The method of aspect 11, further comprising: receiving the respective safe designation and the respective configuration for each of the plurality of ECUs and to load the respective safe designation and the respective configuration into each of the plurality of ECUs, the processing device further configured to allocate a respective thermal design power (TDP) budget to each of the plurality of ECUs based on the respective configuration for each of the plurality of ECUs.

Aspect 13: The method of any of aspects 1 through 12, wherein an ECU of the plurality of ECUs comprises a cluster of multiple ECUs of a same type.

Aspect 14: The method of any of aspects 1 through 13, wherein the power feature comprises one or more of an active power feature or an idle power feature, and wherein the limit feature comprises one or more of a temperature limit, a power limit, a current limit, a voltage limit, or a thermal design power (TDP) limit.

Aspect 15: An apparatus comprising a plurality of electronic control units (ECUs) on a system-on-chip (SoC) of a vehicle and a controller and/or a processing device configured to perform a method of any of aspects 1 through 14.

Aspect 16: A system-on-chip (SoC) comprising at least one means for performing a method of any one of aspects 1 through 14.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and/or 8-10 may be configured to perform one or more of the methods, features, or steps described herein. The novel algorithms described herein may also be efficiently implemented in software and/or embedded in hardware.

Any reference to an element herein using a designation e.g., “first,” “second,” and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

What is claimed is:

1. An apparatus, comprising:

a plurality of electronic control units (ECUs) on a system-on-chip (SoC) of a vehicle; and a controller configured to identify a respective safe designation for each of the plurality of ECUs, the respective safe designation for each of the plurality of ECUs comprising a safety critical designation or a non-safety critical designation, wherein the respective safe designation is based on a respective original equipment manufacturer (OEM) configuration of the safety critical designation or the non-safety critical designation for each of a plurality of vehicle drive modes of the vehicle to be applied upon entering a respective vehicle drive mode of the plurality of vehicle drive modes or each of a plurality of SoC operation stages for each of the plurality of ECUs to be applied upon entering a respective SoC operation stage of the plurality of SoC operation stages, the controller further configured to load a respective configuration of at least one power feature, at least one limit feature, or a combination of the at least one power feature and the at least one limit feature into each of the plurality of ECUs based on the respective safe designation comprising the safety critical designation or the non-safety critical designation.

2. The apparatus of claim 1, wherein a first ECU of the plurality of ECUs on the SoC is configured to run a first workload with the safety critical designation and a second ECU of the plurality of ECUs on the SoC is configured to run a second workload with the non-safety critical designation.

3. The apparatus of claim 1, wherein at least one of the safety critical designation or the non-safety critical designation comprises performance requirements related to runtime deadlines.

4. The apparatus of claim 1, wherein the controller is further configured to:

modify the respective safe designation of at least one ECU of the plurality of ECUs in response to a change of at least one of a vehicle drive mode of the plurality of vehicle drive modes of the vehicle or an SoC operation stage of the plurality of SoC operation stages.

5. The apparatus of claim 4, wherein the SoC operation stage comprises one of a boot stage, a run stage, a sleep stage, or a power-down stage.

6. The apparatus of claim 4, wherein the vehicle drive mode comprises one of a parked mode, a stopped mode, or a driving mode, each associated with cooling or without cooling of the vehicle.

7. The apparatus of claim 4, wherein the controller is further configured to:

generate the respective configuration for each of the plurality of ECUs based on the respective safe designation associated with at least one of the vehicle drive mode or the SoC operation stage.

8. The apparatus of claim 7, wherein the controller is further configured to:

statically generate the respective configuration for each of the plurality of ECUs based on the respective original equipment manufacturer (OEM) safe designation associated with at least one of the vehicle drive mode or the SoC operation stage for each of the ECUs.

9. The apparatus of claim 7, wherein the controller is further configured to:

dynamically generate the respective configuration for each of the plurality of ECUs based on a respective workload running on each of the plurality of ECUs at a boundary between respective SoC operation stages or respective vehicle drive modes, the respective workload being associated with one of the safety critical designation or the non-safety critical designation.

10. The apparatus of claim 7, wherein the controller is further configured to:

distribute the respective configuration for each of the plurality of ECUs from an application layer to the plurality of ECUs via a secure channel.

11. The apparatus of claim 10, further comprising:

a processing device configured to receive the respective safe designation and the respective configuration for each of the plurality of ECUs and to load the respective safe designation and the respective configuration into each of the plurality of ECUs, the processing device further configured to allocate a respective thermal design power (TDP) budget to each of the plurality of ECUs based on the respective configuration for each of the plurality of ECUs.

12. The apparatus of claim 1, wherein an ECU of the plurality of ECUs comprises a cluster of multiple ECUs of a same type.

13. The apparatus of claim 1, wherein the power feature comprises one or more of an active power feature or an idle power feature, and wherein the limit feature comprises one or more of a temperature limit, a power limit, a current limit, a voltage limit, or a thermal design power (TDP) limit.

14. A method of safe designation on a system-on-chip (SoC), the method comprising:

identifying a respective safe designation for each of a plurality of electronic control units (ECUs) on the SoC of the vehicle, the respective safe designation for each of the plurality of ECUs comprising a safety critical designation or a non-safety critical designation, wherein the respective safe designation is based on a respective original equipment manufacturer (OEM) configuration of the safety critical designation or the non-safety critical designation for each of a plurality of vehicle drive modes of the vehicle to be applied upon entering a respective vehicle drive mode of the plurality of vehicle drive modes or each of a plurality of SoC operation stages for each of the plurality of ECUs to be applied upon entering a respective SoC operation stage of the plurality of SoC operation stages; and loading a respective configuration of at least one power feature, at least one limit feature, or a combination of the at least one power feature and the at least one limit feature into each of the plurality of ECUs based on the respective safe designation comprising the safety critical designation or the non-safety critical designation.

15. The method of claim 14, wherein a first ECU of the plurality of ECUs on the SoC is configured to run a first workload with the safety critical designation and a second ECU of the plurality of ECUs on the SoC is configured to run a second workload with the non-safety critical designation.

16. The method of claim 14, wherein at least one of the safety critical designation or the non-safety critical designation comprises performance requirements related to runtime deadlines.

17. The method of claim 14, further comprising:

modifying the respective safe designation of at least one ECU of the plurality of ECUs in response to a change of at least one of a vehicle drive mode of the plurality of vehicle drive modes of the vehicle or an SoC operation stage of the plurality of SoC operation stages.

18. The method of claim 17, wherein the SoC operation stage comprises one of a boot stage, a run stage, a sleep stage, or a power-down stage.

19. The method of claim 17, wherein the vehicle drive mode comprises one of a parked mode, a stopped mode, or a driving mode, each associated with cooling or without cooling of the vehicle.

20. The method of claim 17, further comprising:

generating the respective configuration for each of the plurality of ECUs based on the respective safe designation associated with at least one of the vehicle drive mode or the SoC operation stage.

21. The method of claim 20, wherein the generating the respective configuration further comprises:

statically generating the respective configuration for each of the plurality of ECUs based on the respective original equipment manufacturer (OEM) safe designation associated with at least one of the vehicle drive mode or the SoC operation stage for each of the ECUs.

22. The method of claim 20, wherein the generating the respective configuration further comprises:

dynamically generating the respective configuration for each of the plurality of ECUs based on a respective workload running on each of the plurality of ECUs at a boundary between respective SoC operation stages or respective vehicle drive modes, the respective workload being associated with one of the safety critical designation or the non-safety critical designation.

23. The method of claim 20, wherein the loading the respective configuration further comprises:

distributing the respective configuration for each of the plurality of ECUs from an application layer to the plurality of ECUs via a secure channel.

24. The method of claim 23, further comprising:

allocating a respective thermal design power (TDP) budget to each of the plurality of ECUs based on the respective configuration for each of the plurality of ECUs.

25. The method of claim 14, wherein the power feature comprises one or more of an active power feature or an idle power feature, and wherein the limit feature comprises one or more of a temperature limit, a power limit, a current limit, a voltage limit, or a thermal design power (TDP) limit.

26. A system-on-chip (SoC), comprising:

means for identifying a respective safe designation for each of a plurality of electronic control units (ECUs) on the SoC of the vehicle, the respective safe designation for each of the plurality of ECUs comprising a safety critical designation or a non-safety critical designation, wherein the respective safe designation is based on a respective original equipment manufacturer (OEM) configuration of the safety critical designation or the non-safety critical designation for each of a plurality of vehicle drive modes of the vehicle to be applied upon entering a respective vehicle drive mode of the plurality of vehicle drive modes or each of a plurality of SoC operation stages for each of the plurality of ECUs to be applied upon entering a respective SoC operation stage of the plurality of SoC operation stages; and means for loading a respective configuration of at least one power feature, at least one limit feature, or a combination of the at least one power feature and the at least one limit feature into each of the plurality of ECUs based on the respective safe designation comprising the safety critical designation or the non-safety critical designation.

27. The SoC of claim 26, further comprising:

means for modifying the respective safe designation of at least one ECU of the plurality of ECUs in response to a change of at least one of a vehicle drive mode of the plurality of vehicle drive modes of the vehicle or an SoC operation stage of the plurality of SoC operation stages.

28. The SoC of claim 27, further comprising:

means for generating the respective configuration for each of the plurality of ECUs based on the respective safe designation associated with at least one of the vehicle drive mode or the SoC operation stage.

29. The apparatus of claim 1, wherein the respective configuration is based on a respective additional OEM configuration for each of the safety critical designation and the non-safety critical designation for each of the plurality of ECUs.

30. The method of claim 14, wherein the respective configuration is based on a respective additional OEM configuration for each of the safety critical designation and the non-safety critical designation for each of the plurality of ECUs.

* * * * *